(12) United States Patent
Kishan et al.

(10) Patent No.: US 12,386,911 B2
(45) Date of Patent: Aug. 12, 2025

(54) SEARCH SERVICE FOR A NETWORK OF SOCIAL MACHINES

(71) Applicant: SAP SE, Walldorf (DE)

(72) Inventors: Gopi Kishan, Bangalore (IN); Rohit Jalagadugula, Visakhapatnam (IN); Kavitha Krishnan, Bangalore (IN); Sai Hareesh Anamandra, Bengaluru (IN); Akash Srivastava, Lucknow (IN)

(73) Assignee: SAP SE, Walldorf (DE)

( * ) Notice: Subject to any disclaimer, the term of this patent is extended or adjusted under 35 U.S.C. 154(b) by 151 days.

(21) Appl. No.: 17/951,320

(22) Filed: Sep. 23, 2022

(65) Prior Publication Data
US 2024/0104153 A1 Mar. 28, 2024

(51) Int. Cl.
*G06F 16/00* (2019.01)
*G06F 16/9532* (2019.01)
*G06F 16/9536* (2019.01)
*G06F 16/954* (2019.01)
*G06F 16/9538* (2019.01)

(52) U.S. Cl.
CPC ...... *G06F 16/9536* (2019.01); *G06F 16/9532* (2019.01); *G06F 16/954* (2019.01); *G06F 16/9538* (2019.01)

(58) Field of Classification Search
CPC ............... G06F 16/9532; G06F 16/954; G06F 16/9538; G06F 16/9035; G06F 16/9536
See application file for complete search history.

(56) References Cited

U.S. PATENT DOCUMENTS

| | | | | |
|---|---|---|---|---|
| 2014/0089410 A1* | 3/2014 | Ahmed | ................... | H04L 67/10 709/204 |
| 2016/0373456 A1* | 12/2016 | Vermeulen | .......... | G06F 16/3322 |
| 2017/0078448 A1* | 3/2017 | Overman | ............ | G06F 16/2365 |
| 2019/0370707 A1* | 12/2019 | Liu | ...................... | H04L 63/0428 |
| 2023/0100501 A1* | 3/2023 | Yu | ......................... | H04L 67/535 706/45 |

OTHER PUBLICATIONS

Ait-Mlouk et al., "KBot: A Knowledge Graph Based ChatBot for Natural Language Understanding Over Linked Data," *IEEE Access*, vol. 8, pp. 149220-149230 (Aug. 2020).
Pticeck et al., "Beyond the Internet of Things: The Social Networking of Machines," *Int'l Journal of Distributed Sensor Networks*, vol. 2016, pp. 1-15 (Apr. 2016).

* cited by examiner

*Primary Examiner* — Dinku W Gebresenbet
(74) *Attorney, Agent, or Firm* — Klarquist Sparkman, LLP

(57) ABSTRACT

A method includes receiving, at a search toolbar, a search query from a machine in a network. The machine has an associated machine profile for participating in the network as an entity. The machine profile includes a machine identifier and machine metadata. A query type is determined from the search query. A search context for the machine is determined using a semantic graph of the network. From a set of services for the network, one or more relevant services to respond to the search query are identified based on the query type and the search context. The search query is applied to the one or more relevant services to obtain a set of responses. A set of relevant results for the search query is determined from the set of responses. The set of relevant results is transmitted to the machine.

20 Claims, 4 Drawing Sheets

SEARCH SERVICE FOR A NETWORK OF SOCIAL MACHINES

FIELD

The field generally relates to searching content in decentralized networks.

BACKGROUND

A network of social machines (also known as a social network of machines or machine social network) includes autonomous machines that can interact with each other (e.g., form connections with each other, offer services to each other, and solve problems together). The network can include various other entities (e.g., non-machine entities) that can communicate with the machines in the network. The entities participating in the network can provide various sources of information to the network. There is a need for a search service that enables searching and exploring content across the network within the context of entities.

DETAILED DESCRIPTION

Example I—Overview

Described herein are technologies that provide a search service for a decentralized network, such as a network of social machines (or a social network of machines). The search service can receive a search query from a machine in the network, determine a search context of the machine using a semantic graph of the network, and search for answers to the search query based on the search context of the machine. The technologies can enable searching and exploring content by entities participating in the network within the context of the entities.

Example IIA—Entity

A network of social machines (or a social network of machines) is a generalization of machine to machine (M2M) connectivity framework and Internet of Things (IoT) framework. Entities in the network are represented by profiles, and connections can be formed between the profiles. A semantic graph of the network can be built that includes the entities as nodes and relationships between the entities as edges connecting the nodes. In a network of social machines, entities can be equipment manufacturer (suppliers), company/plant/factory (customers), equipment/machines, financial institutions, service organizations, resellers, etc.

Example IIB—Machine

A machine is a device that has a decision-making functionality (e.g., can scan the status of sensors, make periodic health checks, perform troubleshooting if needed, etc.) and some predictive analytics capabilities (e.g., can determine or predict sensors or parts that need attention, replacement, or service). The machine has the capability of networking with similar types of configuration machines. The machine can have the capability to mine through past history of services and replacements, including any feedback and status details on the services and replacements.

Example IIC—Machine Profile

A machine participating as an entity in a network of social machines has a machine profile. The machine can generate the machine profile by itself when it joins the network. The machine profile has a public part and a private part. The machine can use the public part of the machine profile to participate in the network (e.g., join communities in the network). The machine profile can include an identifier of the machine and metadata of the machine. Examples of information that can be stored in the metadata can include manufacturing details of the machine, configuration details and health of sensors associated with the machine, and service/replacement history of sensors/parts associated with the machine. In some examples, the identifier and metadata can be stored in the private part of the machine profile.

Example III—Example System Implementing Search Service

Figure 1:
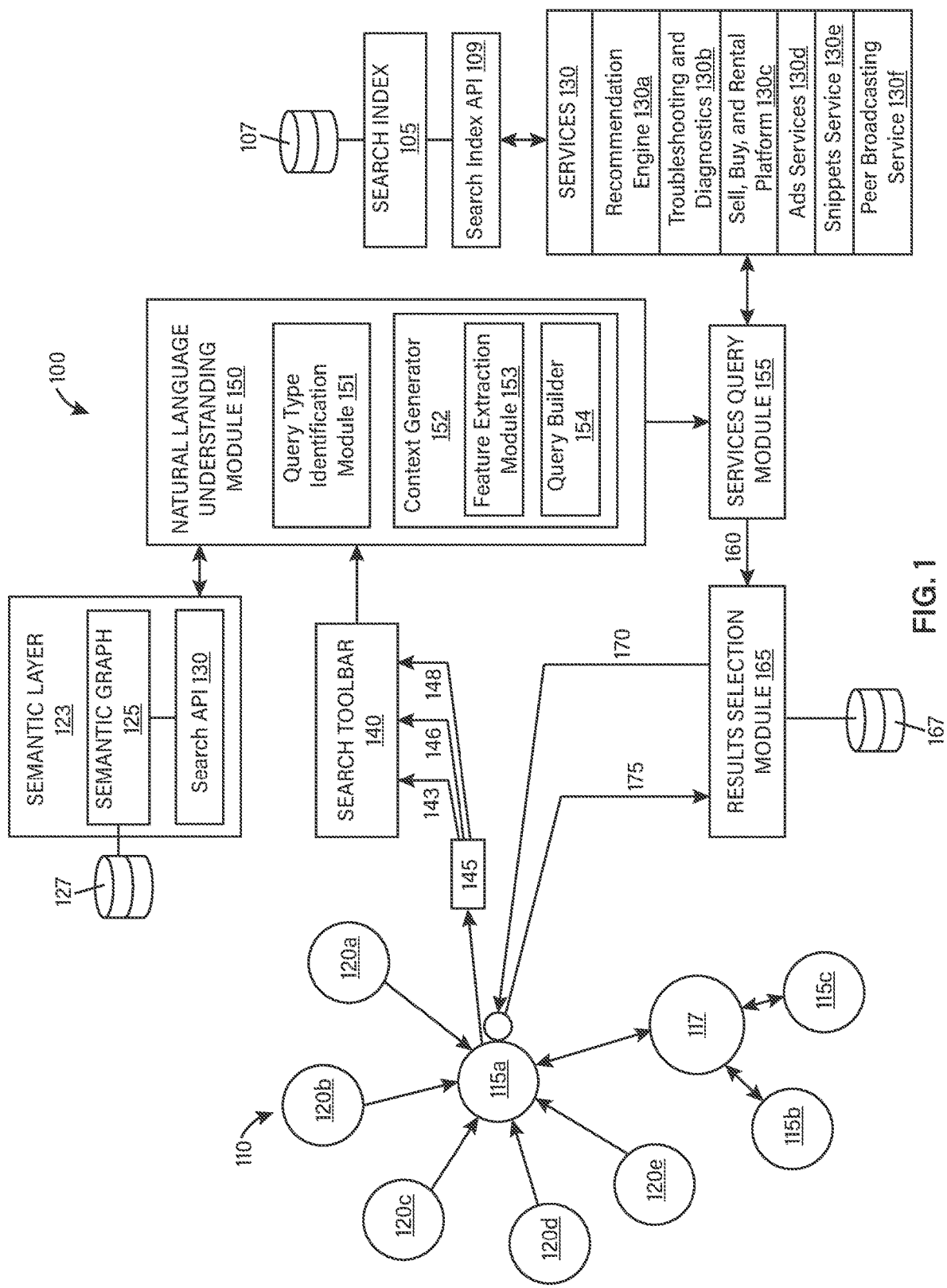
FIG. 1 is a block diagram of an example system implementing a search service.

FIG. 1 is a block diagram of an example system 100 that can provide a search service to a decentralized network 110 (e.g., a network of social machines). The network 110 can include entities (e.g., machines and non-machine entities as described in Example IIA). For illustrative purposes, machines 115a, 115b, 115c are shown as examples of machine entities participating in the network 110. Machines 115a, 115b, 115c are communicating with a platform 117, which in one illustrative example can be a hybrid platform implementing Internet of Things (IoT) connectivity framework and machine-to-machine (M2M) connectivity framework. In some examples, machines 115a, 115b, 115c are autonomous machines (see Example IIB) that can have associated machine profiles (see Example IIC) and interact with each other (e.g., form connections with each other, offer services to each other, and solve problems together).

For illustrative purposes, entities 120a, 120b, 120c, 120d, 120e interacting with the machine 115a are shown as examples of non-machine entities participating in the network 110. For illustrative purposes, the entity 120a can be suppliers (e.g., equipment manufacturer) selling machines as a product or service; the entity 120b can be customers (e.g., company, plant, or factory) using the machines for production; the entity 120c can be a service organization offering service and maintenance contracts; the entity 120d can be resellers; and the entity 120e can be financial institutions funding machine purchases.

The system 100 can include a semantic layer 123 including a semantic graph 125 (which can also be referred to as a knowledge graph) of the network 110. The semantic graph 125 is a semantic network representing relationships between the entities in the network 110, how the entities are related to each other, and what the entities communicate to each other. The information contained in the semantic graph 125 can be stored in a database 127. The semantic layer 123 can include a search API 130 that can be used to query the semantic graph 125 for information about entities. The semantic layer 123 can dynamically build subgraphs of the semantic graph 125. For example, a request to the search API 130 can include a set of entities, and the semantic layer 123 can build or extract a semantic subgraph associated with the set of entities from the semantic graph 125.

In some examples, the system 100 can include a search index 105 for content (e.g., documents) in the network 110. A process running continuously in the backend can continuously crawl the network 110 to identify sources of information in the network and progressively build the search index 105. The content that is indexed can be from entities in the network 110. For example, the entity 120a can provide prescriptive solutions for problems that a machine might encounter. The process indexes the information found during crawling and builds a database 107 with the information. The system 100 can include a search index API 109 that can be used to query the search index 105 for information in the network.

The system 100 can include a set of services 130 for the network 110. The services 130 can interact with the search index 105 (e.g., through the search index API 109) to find answers to search queries or can interact with machines in the network 110 to find answers to search queries. For illustrative purposes, example services 130a-f are shown. For example, the service 130a can be a recommendation engine, the service 130b can be troubleshooting and diagnostics, the service 130c can be sell, buy, and rental platform, the service 130d can be ads services, the service 130e can be snippets service, and the service 130f can be peer broadcasting service. Example use of the example services for a machine is indicated in Table 1 below.

TABLE 1

| Services | Example Use Case |
| --- | --- |
| Recommendation Engine | Machine is looking for a potential community to join. Machine wants validation on best practice under a certain condition. |
| Troubleshooting and Diagnostic | Machine is looking for help on a problem from other machines. Machine is looking for historically similar troubles. Machine is looking for a manufacturer prescription solution. Machine is looking for a potential human engineer to solve a problem. |
| Sell, Buy, and Rental Platform | Machine is looking for an optimal sell, buy, or rent price and a place for a machine. |
| Ads Services | Machine wants to display relevant advertisement on demand. |
| Snippets Service | Machine wants step by step guidance. |
| Peer Broadcasting Service | Machine is looking for help on a problem from other machines. |

The system 100 includes a search toolbar 140 that serves as an interface to the search service. The search toolbar 140 can receive a search query from a machine in the network 110. For example, the machine can generate the search query in response to interactions with entities in the network or in response to events in the machine. For illustration purposes, the search toolbar 140 is shown as receiving a search query 145 from the machine 115a. The search query 145 can include a text query 143, which can be in the form of natural language text. For illustration purposes, an example search query S transmitted from the machine to the search toolbar 140 can include the text query "I am facing event x, how to fix it".

In addition to the text query 143, the search query 145 can include machine metadata 146 from the machine 115a. The machine sending the search query 145 can extract metadata information from its machine profile and provide the metadata information as machine metadata 146 in the search query 145. In some examples, the search query 145 can also include a potential service 148 that the machine 115a desires to provide the answer to the search query. For example, the machine 115a can select a service from the set of services 130 to provide answers to the search query 145. The search service can also select other services to provide answers to the search query 145 besides the one suggested by the machine.

In some examples, the search query 145 transmitted to the search toolbar 140 can include the text query 143, the machine metadata 146, and the potential service 148. In other examples, only the text query 143 is initially transmitted to the search toolbar 140 as the search query 145. In these other examples, the search toolbar 140 can subsequently request the machine to send the remaining parts of the search query 145 (e.g., the machine metadata 146 and optionally the potential service 148). The communication data from the machine 115a to the search toolbar 140 can include the machine identifier so that the search toolbar 140 can communicate with the relevant machine. When the search toolbar 140 receives the remaining parts of the search query 145, the search toolbar 140 can combine all the parts to form the complete search query 145.

The system 100 can include a natural language understanding module 150 that receives the search query 145 (e.g., text query 143, machine metadata 146, and optionally the potential service 148) from the search toolbar 140. The natural language understanding module 150 can determine the query type of the search query 145 and determine a search context of the machine for the search query 145.

In some examples, the natural language understanding module 150 can include a query type identification module 151 that accepts the search query 145 as input and outputs a query type of the search query 145 (e.g., whether the search query is asking for recommendation, troubleshooting, ads, etc.). The query type identification module 151 can include a defined set of query types that correspond to the set of services 130. Examples of query types can include recommendation (corresponding to recommendation engine in Table 1); troubleshooting/diagnostic (corresponding to troubleshooting and diagnostic in Table 1); machine-to-machine (M2M) communication (corresponding to peer broadcasting service in Table 1); sell, buy, and rental request (corresponding to sell, buy, and rental platform in Table 1); and ad request (corresponding to ads services in Table 1); and snippets (corresponding to snippets service in Table 1).

The information contained in the text query 143 or the potential service 148 can provide a clue to the query type of the search query 145. In one example, the query type identification module 151 can use a classifier (such as XGBoost algorithm) to classify the search query into one of the query types. In another example, the query type identification module 151 can include a tokenizer that extracts tokens from the search query 145. For example, the tokenizer can segment the search query 145 into text elements, such as one or more words, while taking into account grammar, syntax, and user sentiment. The text elements can provide the tokens. The query type identification module 151 can include a repository that stores tokens-to-query-type mappings. A tokens-to-query-type mapping can identify a relationship between one of the defined query types and a specific set of tokens. The query type identification module 151 can search the repository for a query type that best matches the tokens generated for the search query 145.

The natural language understanding module 150 can include a context generator 152 that accepts the search query 145 and determines a search context of the machine 115a for the search query 145. For example, the context generator 152 can include a feature extraction module 153 that extracts features from the search query 145. For example, the feature extraction module 153 can extract features from the search query 145 using natural language processing such as a semantic encoder (e.g., Word2Vec) or Bidirectional Encoder Representations from Transformers (BERT) embedding. In some examples, the feature extraction module 153 can output a set of search query parameters comprising an entities parameter, a relationships parameter, a constraints parameter, and a machine metadata parameter.

In some examples, the feature extraction module 153 extracts a set of entities from the search query 145. The set of entities can provide the entities parameter for the set of search query parameters. The feature extraction module 153 can request a semantic subgraph associated with the set of entities from the semantic layer 123. From the semantic subgraph, the feature extraction module 153 can determine relationships. The relationships can provide a relationships parameter for the set of search query parameters. The feature extraction module 153 can extract constraint features (e.g., time, location, and resources) from the tokens and generate a set of constraints. The set of constraints can provide the constraints parameter for the set of search query parameters. The feature extraction module 153 can extract machine metadata from the search query 145. The machine metadata can provide the machine metadata parameter for the set of search query parameters.

The context generator 152 can include a query builder 154 that generates a set of queries for the semantic graph 125 based on the set of search query parameters outputted by the feature extraction module 153. The set of queries can be designed to find information to build the search context of the search query 145 for the machine 115a. For illustrative purposes, for the example search query S, queries to the semantic graph 125 can include, for example, find all the machines that have faced or are facing event x; find the history of events recorded for successful troubleshooting of event x; find troubleshooting or snippet step-by-step procedures used in the past to address event x; etc. The context generator 152 can apply the set of queries to the search API 130 of the semantic graph 125 to obtain a set of query results.

The context generator 152 can use the query results obtained from the semantic graph 125 to build the search context. For illustrative purposes, for the example search query S, the search context can include data for the machine facing event x, history of events relevant to event x, list of machines along with metadata and machine profiles that have faced or are facing the event x, troubleshooting or snippet step-by-step procedure used in the past and its effectiveness in resolving event x, past decisions taken at the machine facing event x, and current configuration, sensor data, health status, and metadata of the machine facing event x. The search context can be in the form of a graph that captures the entities, relationships, and constraints related to the search query and a dictionary that captures the metadata for the graph.

The system 100 can include a services query module 155 that receives the query type, search query, and search context from the natural language understanding module 150. The services query module 155 can query the set of services 130 for responses to the search query based on the query type and search context.

In some examples, the services query module 155 can sort the set of services 130 for relevance based on the query type and the search context. The set of services 130 can be sorted using machine learning. For example, a Natural Language Processing (NLP) transformer-based machine learning technique, such as Bidirectional Encoder Representations (BERT), with ranking based on relevancy score can be used to sort the services. The services query module 155 can select one or more relevant services from the sorted set of services, generate queries for the one or more relevant services, apply the queries to the one or more relevant services, and receive responses from the one or more relevant services. The information that the services query module 155 can send to a relevant service can include entities involved in the search query along with relationships, the query type, the search context, and any constraints in the query.

The example services 130a-e can interact with the search index 105 to obtain information in the network 110 to use in responding to the search query. The peer broadcasting service 130f on the other hand can interact with machines in the network 110 to obtain information to use in responding to the search query. For some query types, such as troubleshooting and diagnostic, the services query module 155 can use a combination of a relevant service (such as services 130a-e) that can generate responses to a search query without involvement of the machines in the network 110 and a relevant service (such as the peer broadcasting service 1300 that can generate responses to a search query with involvement of the machines in the network 110.

Given the identifier of a machine, the peer broadcasting service 130f can determine the peer machines for the given machine, transmit a query to the peer machines, and receive responses to the query from the peer machines. In some examples, the machines in the network 110 can be clustered based on similarity of machine profiles or interests. The peer broadcasting service 130f can determine peer machines for the machine having the given identifier from the relevant machine cluster. The peer broadcasting service 130f exploits the cluster information to ensure that only relevant entities receive the relevant information instead of a simple broadcasting of information to all entities in the network. This enables efficiency and effectiveness of the search.

In some examples, the services query module 155 can send the search query 145, the query type of the search query 145, and an identifier of the machine involved in the search query 145 to the peer broadcasting service 130f. The peer broadcasting service 130f can prepare the query to transmit to the peer machines using the search query, query type, and other communication data. The peer broadcasting service 130f can transmit the query to the peer machines, receive responses from the peer machines, and aggregate the responses. The peer broadcasting service 130f can transmit the aggregated responses to the services query module 155, which can combine the aggregated responses with other responses from other relevant services.

The system 100 can include a results selection module 165 that receives a set of responses 160 from the services query module 155. The set of responses 160 can be the entire collection of responses received from the relevant services queried by the services query module 155 for responses or can be a filtered set of the responses received from the relevant services. The results selection module 165 can also receive the search query and the search context from the services query module 155. The results selection module 165 ranks the set of responses 160 based on one or more factors, such as quality, search context, and usability. The quality of a response is affected by feedback on the relevancy of results to the search context. The usability of a response is related to the frequency at which the entity is using the relevant service that produced the response. Different search contexts can produce different relevancy scores/ranking.

The results selection module 165 presents a set of relevant results 170 to the machine 115a. For example, the results selection module 165 can transmit data to the machine 115a that includes the set of relevant results 170. The set of relevant results 170 can be the top k responses after ranking the set of responses 160 (k can be less than or equal to the number of responses received from the services query module 155). The results selection module 165 can also store the search query 145, the search context, and the relevant results 170 in a database 167.

The machine 115a, after reviewing the relevant results, can provide feedback. For example, the feedback can indicate whether a result provided a correct answer, a partially correct answer, or an incorrect answer to the search query. The results selection module 165 can receive feedback 175 on one or more of the relevant results from the machine 115a. The results selection module 165 can store the feedback 175 in the database 167 in association with the corresponding search query, search context, and relevant results.

In some examples, the feedback data stored in the database 167 can be used as training data for the natural language understanding module 150 and the services query module 155. For example, when a relevant result associated with a search query has a negative feedback, the relevancy score of the relevant result can be reduced below a threshold so that the relevant result serves as a negative example. A relevant result with a positive feedback can be used as a positive example, for example, by keeping the relevancy score of the relevant result above the threshold.

The system can be implemented in a computer system or a network of computer systems. The components of the system 100 can be stored in one or more computer-readable storage media or computer-readable storage devices and executed by one or more processor units. The technologies described herein can be generic to the specifics of operating systems or hardware and can be applied in any variety of environments to take advantage of the described features.

Example IV—Example Method Implementing Search Service

Figure 2:
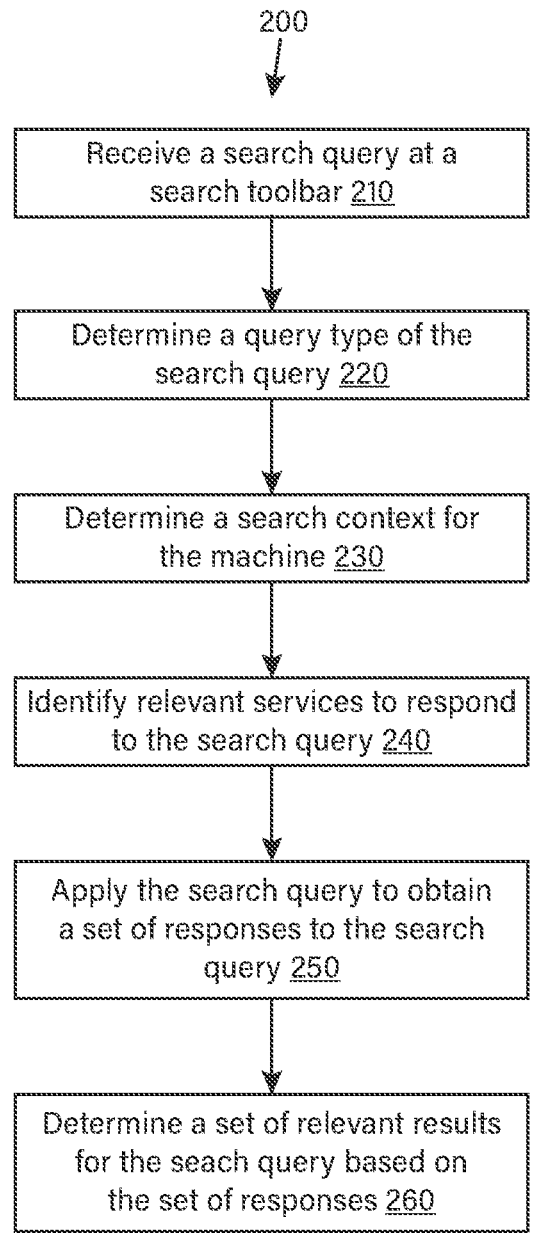
FIG. 2 is a block diagram of an example method implementing a search service.

FIG. 2 is a flowchart of an example method 200 of providing a search service to a decentralized network and can be performed, for example, by the system 100 illustrated in FIG. 1. Operations are illustrated once and each and in a particular order in FIG. 2, but the operations may be reordered and/or repeated as desired and appropriate (for example, different operations illustrated as performed sequentially may be performed in parallel as suitable).

At 210, the method includes receiving a search query at a search toolbar of a search service. The search query can be received from a machine in a network. For example, the machine can communicate with the search toolbar via machine-to-machine communication. In some examples, the method can include receiving a potential service identifier from the machine along with the search query. The potential service identifier can identify a service from a set of services for the network to use in answering the search query. For illustration purposes, an example search query S can be "I am facing event x, how to fix it".

The method can include receiving metadata of the machine. In some examples, the machine can transmit the metadata with the search query. In other examples, the search toolbar can fetch the metadata of the machine after receiving the search query. For example, the identifier of the machine can be determined from the communication data accompanying the search query. The search toolbar can send a request to the network 110 for retrieval of the metadata from the machine associated with the machine identifier. The metadata of the machine can include various types of information about the machine, such as type, location, cost, life, configuration, sensor information, health status of each of the sensors, history of events that need troubleshooting, and predictive analysis of sensor status/machine parts (see Example III).

At 220, the method includes determining a query type of the search query. The query type can be selected from a predefined list of query types corresponding to services for the network. In some examples, the method can include extracting a set of tokens from the search query and searching a repository of tokens-to-query-type mappings for a tokens-to-query-type mapping that best matches the set of tokens. The query type can be determined from the best matching tokens-to-query type mapping. In some cases, if a potential service identifier is provided by the machine along with the search query, the query type can be determined from the service indicated by the potential service identifier.

At 230, the method includes determining a search context for the machine. The method can include extracting features from the search query. The method includes building a set of queries for a semantic graph of the network based on the features extracted from the search query and based on the machine metadata. The set of queries is applied to the semantic graph to obtain information related to the features. The method includes building the search context using the information obtained from the semantic graph and the features extracted from the search query. In some examples, the search context can include a graph that captures the entities, relationships, and constraints and a dictionary that captures the data associated with the entities and the metadata associated with the data. In some examples, features can be extracted from the metadata of the machine and used together with the features extracted from the search query in generating the set of queries for the semantic graph. In this case, the search context can include the information obtained from the semantic graph and the features extracted from the search query and the machine metadata. For the example search query S, the search context can include the entities involved in the search query (e.g., the machine facing Event X), history of events relevant to Event X, list of machines along with metadata and profiles that faced the Event X, troubleshooting or snippet step-by-step procedure used in the past and its effectiveness, past decisions taken at the machine facing Event X, and current configuration, sensor data, health status, and metadata of the machine facing Event X.

At 240, the method includes identifying one or more relevant services to respond to the search query. In some examples, a set of services is associated with the network. The method can include identifying which of these services can provide answers to the search query. The identification can be based on the query type of the search query determined in operation 220 and the search context determined in operation 230. For example, query types can be associated with the services. If more than one service can provide answers to a particular query type, then the search context can be used to further determine which of the services is better suited to provide answers to the search query having the particular query type.

At 250, the method includes applying the search query to the one or more relevant services to obtain a set of responses to the search query. In some examples, the relevant services can interact with a search index to obtain information from the network to use in answering the search query. The method can apply the search query to the relevant services and receive responses from the relevant services. In some examples, the method can include transmitting the search query and query type to a peer broadcasting service to obtain responses to the search query from peer machines. The peer broadcasting service can determine peer machines to receive the search query and query type. In some examples, machines with similar profile or interest can be extracted from metadata machine profiles and used to cluster the machines. The cluster of machines containing the machine involved in the search query can provide the peer machines that receive the search query and query type. In these examples, the method can combine the responses from the one or more relevant services and the responses from the peer machines to form the set of responses to the search query.

At 260, the method includes determining a set of relevant results for the search query from the set of responses obtained in operation 250. The method can include ranking the responses based on one or more factors, such as quality, context, and usability. The method can include selecting the top responses as the relevant results. The set of relevant results, which can be sorted in the order of relevance, can be presented to the machine.

After presenting the relevant results to the machine, the method can include receiving a feedback from the machine on the relevant results. For example, the feedback can indicate whether a result provides a correct answer, a partial answer, or an incorrect answer to the search query. In some examples, a result that provides a correct answer can be considered a positive feedback, and a result that provides a partial answer or an incorrect answer can be considered a negative feedback. The method can include storing the feedback in association with the search query, search context, and query type in a database. The stored feedback data can be used as part of training data for the system. For example, the relevant results with negative feedback can be used as negative examples in training, and the relevant results with positive feedback can be used for positive reinforcement in training. For example, the relevancy score of a relevant result with a negative feedback can be reduced to identify the relevant result with the negative feedback as a negative example, while the relevancy score of a relevant result with a positive feedback can be kept the same or boosted to identify the relevant result with the positive feedback as a positive example.

The method 200 can include building the semantic graph used in operation 230 and the search index used in operation 250 continuously and progressively in the backend.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example V—Example Social Network of Machines

Figure 3:
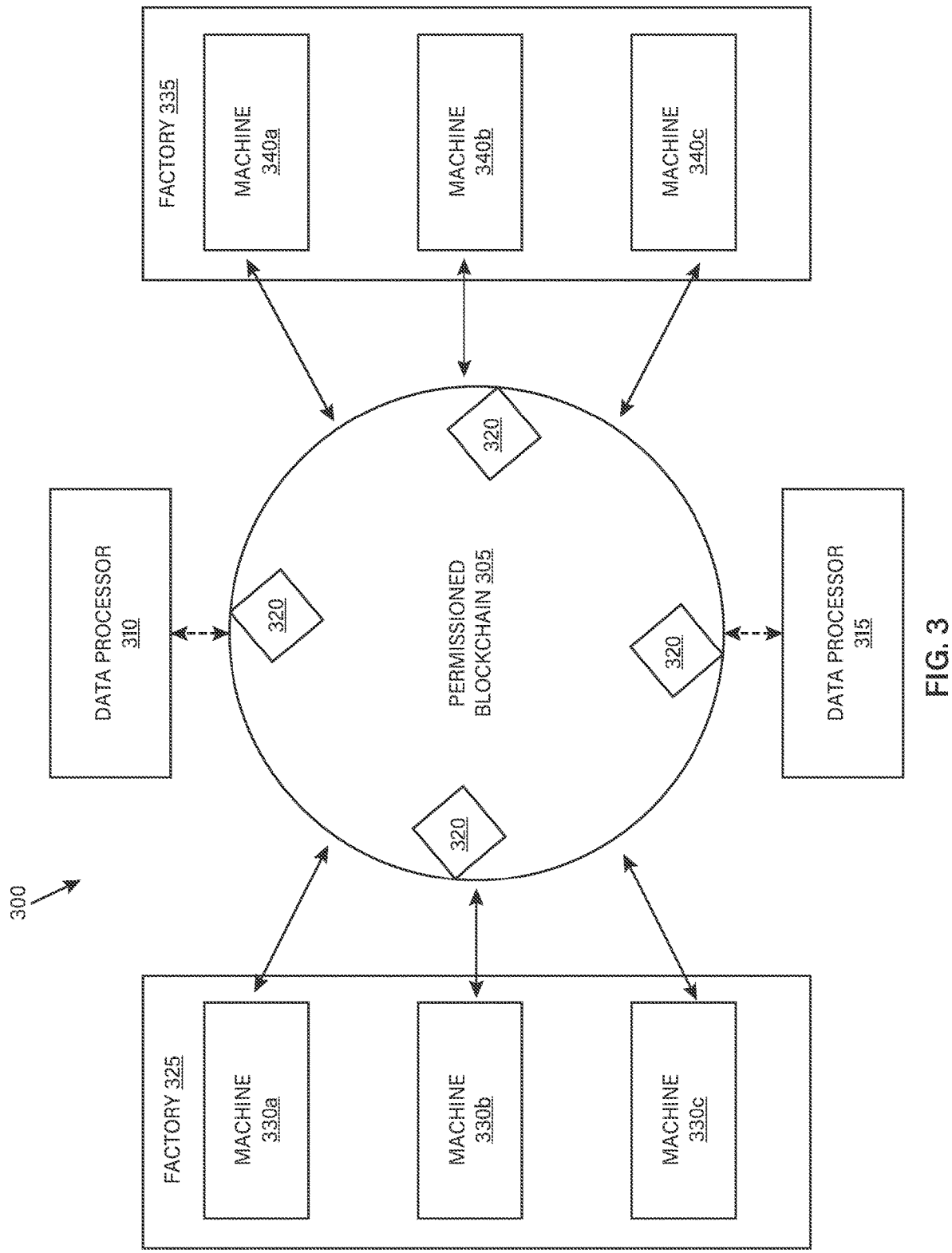
FIG. 3 is a block diagram of an example social network of machines.

FIG. 3 shows an example social network of machines 300 that can use the systems illustrated in FIG. 1 and the method illustrated in FIG. 2. In the illustrated example, the social network of machines 300 includes a permissioned blockchain 305 using one or more nodes 320 to manage the blockchain. For example, each node 320 can maintain a copy of the blockchain ledger. The permission blockchain 305 can run on data processors 310, 315. In the illustrated example, the social network of machines 300 includes a first factory 325 with machines 330a-c that can communicate with the permissioned blockchain 305. In the illustrated example, the social network of machines 300 includes a second factory 335 with machines 340a-c that can communicate with the permissioned blockchain 305. Other entities (see Example IIB) can communicate with the machines via the permissioned blockchain 305.

Example VI—Computing Systems

Figure 4:
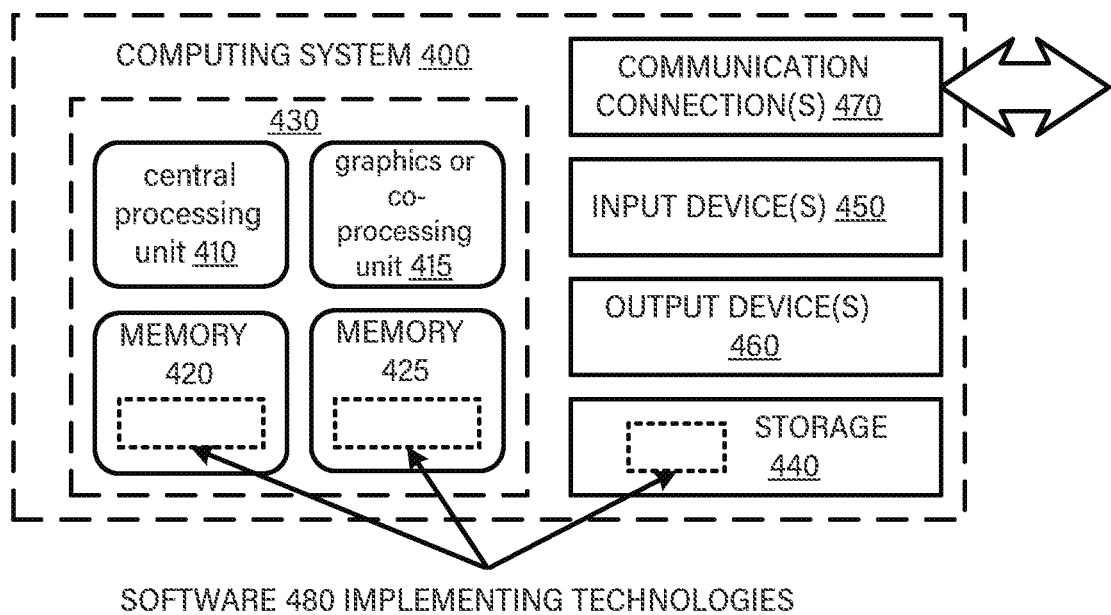
FIG. 4 is a block diagram of an example computing system in which described technologies can be implemented.

FIG. 4 depicts an example of a suitable computing system 400 in which the described innovations can be implemented. The computing system 400 is not intended to suggest any limitation as to scope of use or functionality of the present disclosure, as the innovations can be implemented in diverse computing systems.

With reference to FIG. 4, the computing system 400 includes one or more processing units 410, 415 and memory 420, 425. In FIG. 4, this basic configuration 430 is included within a dashed line. The processing units 410, 415 execute computer-executable instructions, such as for implementing the features described in the examples herein. A processing unit can be a general-purpose central processing unit (CPU), processor in an application-specific integrated circuit (ASIC), graphics processing unit (GPU), tensor processing unit (TPU), quantum processor, or any other type of processor. In a multi-processing system, multiple processing units execute computer-executable instructions to increase processing power. For example, FIG. 4 shows a central processing unit 410 as well as a graphics processing unit or co-processing unit 415. The tangible memory 420, 425 can be volatile memory (e.g., registers, cache, RAM), non-volatile memory (e.g., ROM, EEPROM, flash memory, etc.), or some combination of the two, accessible by the processing unit(s) 410, 415. The memory 420, 425 stores software 480 implementing one or more innovations described herein, in the form of computer-executable instructions suitable for execution by the processing unit(s) 410, 415.

A computing system 400 can have additional features. For example, the computing system 400 includes storage 440, one or more input devices 450, one or more output devices 460, and one or more communication connections 470, including input devices, output devices, and communication connections for interacting with a user. An interconnection mechanism (not shown) such as a bus, controller, or network interconnects the components of the computing system 400. Typically, operating system software (not shown) provides an operating environment for other software executing in the computing system 400, and coordinates activities of the components of the computing system 400.

The tangible storage 440 can be removable or non-removable, and includes magnetic disks, magnetic tapes or cassettes, CD-ROMs, DVDs, or any other medium which can be used to store information in a non-transitory way and which can be accessed within the computing system 400. The storage 440 stores instructions for the software 480 implementing one or more innovations described herein.

The input device(s) 450 can be an input device such as a keyboard, mouse, pen, or trackball, a voice input device, a scanning device, touch device (e.g., touchpad, display, or the like) or another device that provides input to the computing system 400. The output device(s) 460 can be a display, printer, speaker, CD-writer, or another device that provides output from the computing system 400, e.g., actuators or some mechanical devices like motors, 3D printers, and the like.

The communication connection(s) 470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example VII—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example VII—Cloud Computing Environment

Figure 5:
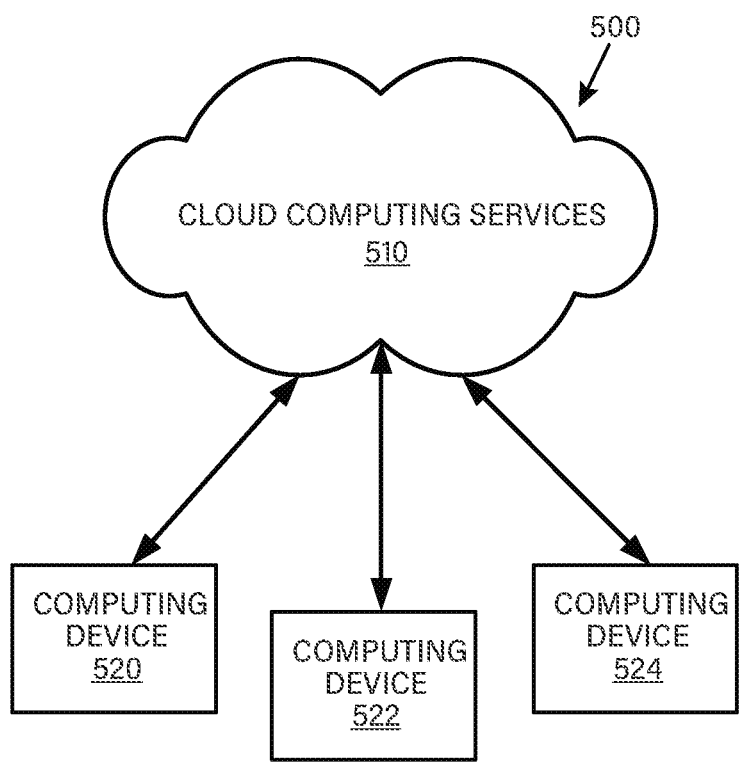
FIG. 5 is a block diagram of an example cloud computing environment that can be used in conjunction with the technologies described herein.

FIG. 5 depicts an example cloud computing environment 500 in which the described technologies can be implemented, including, e.g., the systems described herein. The cloud computing environment 500 comprises cloud computing services 510. The cloud computing services 510 can comprise various types of cloud computing resources, such as computer servers, data storage repositories, networking resources, etc. The cloud computing services 510 can be centrally located (e.g., provided by a data center of a business or organization) or distributed (e.g., provided by various computing resources located at different locations, such as different data centers and/or located in different cities or countries).

The cloud computing services 510 are utilized by various types of computing devices (e.g., client computing devices), such as computing devices 520, 522, and 524. For example, the computing devices (e.g., 520, 522, and 524) can be computers (e.g., desktop or laptop computers), mobile devices (e.g., tablet computers or smart phones), or other types of computing devices. For example, the computing devices (e.g., 520, 522, and 524) can utilize the cloud computing services 510 to perform computing operations (e.g., data processing, data storage, and the like).

In practice, cloud-based, on-premises-based, or hybrid scenarios can be supported.

ADDITIONAL EXAMPLES

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A computer-implemented method comprises receiving, at a search toolbar, a search query from a machine in a network, wherein the machine has an associated machine profile for participating in the network as an entity, wherein the machine profile comprises a machine identifier and machine metadata; determining a query type of the search query; determining a search context for the machine using a semantic graph of the network; identifying, from a set of services for the network, one or more relevant services to respond to the search query based on the query type and the search context; applying the search query to the one or more relevant services to obtain a set of responses; and determining a set of relevant results for the search query from the set of responses, wherein the set of relevant results is transmitted to the machine.

Example 2: The method according to Example 1, wherein determining the search context for the machine using a semantic graph of the network comprises generating a set of search query parameters based on the search query; generating a set of queries based on the set of search query parameters; applying the set of queries to the semantic graph to obtain a set of query results; and building the search context based on the set of query results.

Example 3: The method according to Example 2, wherein generating the set of search query parameters comprises extracting a set of entities from the search query; generating a first parameter for the set of search query parameters based on the set of entities; building a semantic subgraph from the semantic graph based on the set of entities; determining a set of relationships from the semantic subgraph; and generating a second parameter for the set of search query parameters based on the set of relationships.

Example 4: The method according to Example 3, wherein generating the set of search query parameters further comprises extracting machine metadata information from the search query; and generating a third parameter for the set of search query parameters based on the machine metadata information.

Example 5: The method according to Example 4, further comprises receiving the machine metadata information from the machine and adding the machine metadata information to the search query prior to generating the set of search query parameters.

Example 6: The method according to Example 4 or Example 5, wherein generating the set of search query parameters further comprises extracting a set of constraints from the search query; and generating a third parameter for the set of search query parameters based on the set of constraints.

Example 7: The method according to any one of Examples 1-6, wherein applying the search query to the one or more relevant services to obtain a set of responses comprises transmitting the search query to a set of peer machines of the machine and receiving responses from the set of peer machines.

Example 8: The method according to Example 7, wherein transmitting the search query to a set of peer machines of the machine comprises: generating a set of machine clusters based on machine profiles in the network; and determining the set of peer machines from a machine cluster in the set of clusters of machines including the machine identifier.

Example 9: The method according to any one of Examples 1-6, wherein applying the search query to the one or more relevant services to obtain a set of responses comprises applying the search query to a first relevant service to obtain a first set of responses and applying the search query to a second relevant service to obtain a second set of responses, wherein the set of responses is a combination of the first set of responses and the second set responses.

Example 10: The method according to Example 9, wherein applying the search query to the first relevant service to obtain the first set of responses to the search query comprises: transmitting the search query to a set of peer machines; and receiving responses from the set of peer machines, wherein the first set of responses is an aggregation of the responses from the set of peer machines.

Example 11: The method according to any one of Examples 1-10, wherein determining the query type of the search query comprises determining the query type from the search query using a classifier.

Example 12: The method according to any one of Examples 1-10, wherein determining the query type of the search query comprises generating a set of tokens from the search query; searching a repository for a mapping from tokens to query type that matches the set of tokens; and determining the query type from the mapping.

Example 13: The method according to any one of Examples 1-12, wherein the search query comprises a potential service specified by the machine, and wherein determining the query type of the search query comprises determining the query type based on the potential service.

Example 14: The method according to any one of Examples 1-13, further comprises receiving one or more feedback values for the set of relevant results from the machine; storing the one or more feedback values in association with the search query, the search context, and the set of relevant results; and generating at least a portion of a training dataset using the stored feedback values, search query, search context, and set of relevant results.

Example 15: The method according to Example 14, wherein generating at least a portion of the training dataset comprises adjusting a relevancy score of a relevant result responsively to a stored feedback value associated with the relevant result.

Example 16: The method according to any one of Examples 1-15, wherein the set of services comprises one or more of recommendation engine, troubleshooting and diagnostics, sell platform, buy platform, rental platform, ads services, and snippet services.

Example 17: The method according to any one of Examples 1-16, wherein receiving the search query at the search toolbar comprises receiving a text query, at least a portion of the machine metadata in the machine profile, and a selected service from the set of services.

Example 18: The method according to any one of Examples 1-17, wherein the one or more relevant services query a search index of information on the network to generate at least a portion of the set of responses.

Example 19: One or more non-transitory computer-readable storage media stores computer-executable instructions for causing a computer system to perform operations comprising receiving, at a search toolbar, a search query from a machine in a network, wherein the machine has an associated machine identifier and machine metadata; determining a query type of the search query; determining a search context for the machine using a semantic graph of the network; identifying, from a set of services for the network, one or more relevant services to respond to the search query based on the query type and the search context; applying the search query to the one or more relevant services to obtain a set of responses; and determining a set of relevant results for the search query from the set of responses, wherein the set of relevant results is transmitted to the machine identifier.

Example 20: A computing system comprises a network comprising a plurality of machines participating as entities; one or more processing units coupled to memory; and one or more computer-readable storage media storing instructions that when executed by the computing system cause the computing system to perform operations comprising: receiving, at a search toolbar, a search query from a machine in the network, wherein the machine has an associated machine profile for participating in the network as an entity, wherein the machine profile comprises a machine identifier and machine metadata; determining a query type of the search query; determining a search context for the machine using a semantic graph of the network; identifying, from a set of services for the network, one or more relevant services to respond to the search query based on the query type and the search context; applying the search query to the one or more relevant services to obtain a set of responses; and determining a set of relevant results for the search query from the set of responses, wherein the set of relevant results is transmitted to the machine identifier.

Example Implementation

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example Alternatives

The technology has been described with a selection of implementations and examples, but these preferred implementations and examples are not to be taken as limiting the scope of the technology since many other implementations and examples are possible that fall within the scope of the disclosed technology. The scope of the disclosed technology includes what is covered by the scope and spirit of the following claims.

The invention claimed is:

1. A computer-implemented method comprising:
receiving, at a search toolbar, a search query from a machine in a network concerning troubleshooting an event faced by the machine in the network, wherein the machine has an associated machine profile for participating in the network as an entity, wherein the machine profile comprises a machine identifier and machine metadata;
determining a query type of the search query;
determining a search context for the machine using a semantic graph of the network, wherein determining the search context for the machine using the semantic graph of the network comprises generating a set of queries based on the search query, applying the set of queries to the semantic graph to obtain a set of query results, and building the search context based on the set of query results, wherein the search context takes the form of a graph that captures entities and relationships related to the search query and comprises data for the machine facing the event, a history of events relevant to the event, a list of machines along with metadata and machine profiles that have faced or are facing the event, and a troubleshooting or snippet step-by-step procedure used in the past and effectiveness of the troubleshooting or snippet step-by-step procedure in resolving the event;
identifying, from a set of services for the network, one or more relevant services to respond to the search query based on the query type and the search context;
applying the search query to the one or more relevant services to obtain a set of responses; and
determining a set of relevant results for the search query from the set of responses, wherein the set of relevant results is transmitted to the machine.

2. The method of claim 1, wherein determining the search context for the machine using a semantic graph of the network comprises:
generating a set of search query parameters based on the search query; and
generating the set of queries based on the set of search query parameters.

3. The method of claim 2, wherein generating the set of search query parameters comprises:
extracting a set of entities from the search query;
generating a first parameter for the set of search query parameters based on the set of entities;
building a semantic subgraph from the semantic graph based on the set of entities;
determining a set of relationships from the semantic subgraph; and
generating a second parameter for the set of search query parameters based on the set of relationships.

4. The method of claim 3, wherein generating the set of search query parameters further comprises:
extracting machine metadata information from the search query; and
generating a third parameter for the set of search query parameters based on the machine metadata information.

5. The method of claim 4, further comprising receiving the machine metadata information from the machine and adding the machine metadata information to the search query prior to generating the set of search query parameters.

6. The method of claim 4, wherein generating the set of search query parameters further comprises:
extracting a set of constraints from the search query; and
generating a third parameter for the set of search query parameters based on the set of constraints.

7. The method of claim 1, wherein applying the search query to the one or more relevant services to obtain a set of responses comprises transmitting the search query to a set of peer machines of the machine and receiving responses from the set of peer machines.

8. The method of claim 7, wherein transmitting the search query to a set of peer machines of the machine comprises:
generating a set of machine clusters based on machine profiles in the network; and
determining the set of peer machines from a machine cluster in the set of clusters of machines including the machine identifier.

9. The method of claim 1, wherein applying the search query to the one or more relevant services to obtain a set of responses comprises applying the search query to a first relevant service to obtain a first set of responses and applying the search query to a second relevant service to obtain a second set of responses, wherein the set of responses is a combination of the first set of responses and the second set responses.

10. The method of claim 9, wherein applying the search query to the first relevant service to obtain the first set of responses to the search query comprises:
transmitting the search query to a set of peer machines; and
receiving responses from the set of peer machines, wherein the first set of responses is an aggregation of the responses from the set of peer machines.

11. The method of claim 1, wherein determining the query type of the search query comprises determining the query type from the search query using a classifier.

12. The method of claim 1, wherein determining the query type of the search query comprises:
generating a set of tokens from the search query;
searching a repository for a mapping from tokens to query type that matches the set of tokens; and
determining the query type from the mapping.

13. The method of claim 1, wherein the search query comprises a potential service specified by the machine, and wherein determining the query type of the search query comprises determining the query type based on the potential service.

14. The method of claim 1, further comprising:
receiving one or more feedback values for the set of relevant results from the machine;
storing the one or more feedback values in association with the search query, the search context, and the set of relevant results; and generating at least a portion of a training dataset using the stored feedback values, search query, search context, and set of relevant results.

15. The method of claim 14, wherein generating at least a portion of the training dataset comprises adjusting a relevancy score of a relevant result responsively to a stored feedback value associated with the relevant result.

16. The method of claim 1, wherein the set of services comprises one or more of recommendation engine, troubleshooting and diagnostics, sell platform, buy platform, rental platform, ads services, and snippet services.

17. The method of claim 1, wherein receiving the search query at the search toolbar comprises receiving a text query, at least a portion of the machine metadata in the machine profile, and a selected service from the set of services.

18. The method of claim 1, wherein the one or more relevant services query a search index of information on the network to generate at least a portion of the set of responses.

19. One or more non-transitory computer-readable storage media storing computer-executable instructions for causing a computer system to perform operations comprising:
receiving, at a search toolbar, a search query from a machine in a network, wherein the machine has an associated machine identifier and machine metadata and the search query concerns troubleshooting an event faced by the machine in the network;
determining a query type of the search query;
determining a search context for the machine using a semantic graph of the network, wherein determining the search context for the machine using the semantic graph of the network comprises generating a set of queries based on the search query, applying the set of queries to the semantic graph to obtain a set of query results, and building the search context based on the set of query results, wherein the queries comprise find the machines that have faced or are facing the event, find a history of events recorded for successful troubleshooting of the event, and find troubleshooting or snippet step-by-step procedures used in the past to address the event;
identifying, from a set of services for the network, one or more relevant services to respond to the search query based on the query type and the search context;
applying the search query to the one or more relevant services to obtain a set of responses; and
determining a set of relevant results for the search query from the set of responses, wherein the set of relevant results is transmitted to the machine identifier.

20. A computing system comprising:
a network comprising a plurality of machines participating as entities;
one or more processing units coupled to memory; and
one or more computer-readable storage media storing instructions that when executed by the computing system cause the computing system to perform operations comprising:
receiving, at a search toolbar, a search query from a machine in the network, wherein the machine has an associated machine profile for participating in the network as an entity, wherein the machine profile comprises a machine identifier and machine metadata and the search query concerns troubleshooting an event faced by the machine in the network;
determining a query type of the search query;
determining a search context for the machine using a semantic graph of the network, wherein determining the search context for the machine using the semantic graph of the network comprises generating a set of queries based on the search query, applying the set of queries to the semantic graph to obtain a set of query results, and building the search context based on the set of query results, wherein:
(a) the search context takes the form of a graph that captures entities and relationships related to the search query and comprises data for the machine facing the event, a history of events relevant to the event, a list of machines along with metadata and machine profiles that have faced or are facing the event, and a troubleshooting or snippet step-by-step procedure used in the past and effectiveness of the troubleshooting or snippet step-by-step procedure in resolving the event, and
(b) the queries comprise find the machines that have faced or are facing the event. find a history of events recorded for successful troubleshooting of the event, and find troubleshooting or snippet step-by-step procedures used in the past to address the event;
identifying, from a set of services for the network, one or more relevant services to respond to the search query based on the query type and the search context;
applying the search query to the one or more relevant services to obtain a set of responses; and
determining a set of relevant results for the search query from the set of responses, wherein the set of relevant results is transmitted to the machine identifier; wherein the operations further comprise:
extracting one or more entities from the search query; and
extracting one or more constraint features from the search query, wherein the constraint features comprise time, location, or resources;
wherein the set of queries to the semantic graph are based on the one or more entities and the one or more constraint features.

* * * * *